US010156907B2

(12) United States Patent
Caritu

(10) Patent No.: US 10,156,907 B2
(45) Date of Patent: Dec. 18, 2018

(54) DEVICE FOR ANALYZING THE MOVEMENT OF A MOVING ELEMENT AND ASSOCIATED METHOD

(71) Applicant: MOVEA, Grenoble (FR)

(72) Inventor: Yanis Caritu, Saint Joseph la Riviere (FR)

(73) Assignee: InvenSense, Inc., San Jose, CA (US)

(*) Notice: Subject to any disclaimer, the term of this patent is extended or adjusted under 35 U.S.C. 154(b) by 206 days.

(21) Appl. No.: 14/968,076

(22) Filed: Dec. 14, 2015

(65) Prior Publication Data

US 2017/0168081 A1    Jun. 15, 2017

(51) Int. Cl.
G01P 13/00 (2006.01)
G06F 3/01 (2006.01)
G01C 19/00 (2013.01)

(52) U.S. Cl.
CPC ............. *G06F 3/017* (2013.01); *G01C 19/00* (2013.01)

(58) Field of Classification Search
CPC ......... G01P 13/00; G06F 3/017; G01C 19/00; G01B 21/00
See application file for complete search history.

(56) References Cited

U.S. PATENT DOCUMENTS

| 6,215,503 | B1 * | 4/2001 | Snyder | G06T 15/40 345/629 |
| 6,266,064 | B1 * | 7/2001 | Snyder | G06T 15/06 345/421 |
| 9,605,966 | B2 * | 3/2017 | Villien | G01C 21/12 |
| 9,733,729 | B2 * | 8/2017 | Aujay | H04M 1/72544 |
| 2009/0326857 | A1 * | 12/2009 | Mathews | G06F 3/0346 702/141 |
| 2011/0205156 | A1 * | 8/2011 | Gomez | G06F 3/0346 345/157 |
| 2012/0078594 | A1 * | 3/2012 | Jallon | A61B 5/112 703/2 |
| 2013/0328763 | A1 * | 12/2013 | Latta | G06F 3/017 345/156 |
| 2014/0092011 | A1 * | 4/2014 | De Foras | G06F 3/0346 345/157 |

(Continued)

FOREIGN PATENT DOCUMENTS

| EP | 2853992 A1 * | 4/2015 | ............ G06F 3/038 |
| FR | 2933212 A1 * | 1/2010 | ............ G01C 21/16 |

(Continued)

*Primary Examiner* — Laura Menz

(74) *Attorney, Agent, or Firm* — Bay Area Technology Law Group PC

(57) ABSTRACT

A device for analyzing the movement of at least one moving element (EM), provided, for at least one moving element, with first means (DET1) for determining the orientation of a moving coordinate frame (Rm) connected in motion to the moving element (EM), with respect to a reference coordinate frame (Rr), including second means (DET2) for determining at least one locus of points ($T_x$, $T_y$, $T_z$) of at least one surface from at least one respective direction of an oriented axis (x, y, z) of the moving coordinate frame (Rm) connected in motion to the moving element (EM) and said surface.

8 Claims, 3 Drawing Sheets

(56) References Cited

U.S. PATENT DOCUMENTS

| | | | | |
|---|---|---|---|---|
| 2014/0176437 A1* | 6/2014 | Aujay | ............... | H04M 1/72544 |
| | | | | 345/158 |
| 2014/0184509 A1* | 7/2014 | Mathews | .............. | G06F 3/0383 |
| | | | | 345/163 |
| 2014/0229410 A1* | 8/2014 | Jallon | ...................... | G06N 7/00 |
| | | | | 706/12 |
| 2015/0029095 A1* | 1/2015 | Gomez | ................... | G06F 3/017 |
| | | | | 345/156 |
| 2015/0177845 A1* | 6/2015 | Szacherski | .............. | G06F 3/017 |
| | | | | 345/156 |
| 2015/0338875 A1* | 11/2015 | Aujay | ..................... | A63F 13/06 |
| | | | | 700/85 |
| 2016/0077604 A1* | 3/2016 | Youssef | ................ | B60S 1/3856 |
| | | | | 345/157 |
| 2016/0171377 A1* | 6/2016 | Caritu | .................. | G06N 99/005 |
| | | | | 706/14 |
| 2016/0228744 A1* | 8/2016 | Szacherski | ......... | G06K 9/00335 |
| 2017/0168081 A1* | 6/2017 | Caritu | ..................... | G06F 3/017 |
| 2017/0199585 A1* | 7/2017 | Grenet | ................... | G06F 3/038 |
| 2018/0139431 A1* | 5/2018 | Simek | .................. | H04N 5/2258 |

FOREIGN PATENT DOCUMENTS

| | | | | | |
|---|---|---|---|---|---|
| FR | | 2942345 A1 * | 8/2010 | ........... | G06F 3/0346 |
| FR | | 2950713 A1 * | 4/2011 | .............. | G06F 3/017 |
| FR | | 2956229 A1 * | 8/2011 | ........... | G06K 9/00348 |
| WO | WO 2010076313 A1 * | | 7/2010 | ........... | A61B 5/1123 |
| WO | WO 2010092139 A2 * | | 8/2010 | .............. | G10H 1/40 |
| WO | WO 2012072957 A1 * | | 6/2012 | ........... | G01C 21/005 |
| WO | WO 2013034529 A1 * | | 3/2013 | ........... | G06F 3/0346 |
| WO | WO 2013131989 A1 * | | 9/2013 | .............. | G06F 3/011 |
| WO | WO 2013131990 A1 * | | 9/2013 | .............. | A61B 5/1116 |
| WO | WO 2014198805 A1 * | | 12/2014 | ............. | G06F 3/017 |

* cited by examiner

DEVICE FOR ANALYZING THE MOVEMENT OF A MOVING ELEMENT AND ASSOCIATED METHOD

FIELD OF THE INVENTION

The invention relates to a device for analyzing the movement of a moving element provided with means for determining the orientation of a moving coordinate frame connected in motion to the moving element with respect to a reference coordinate frame.

BACKGROUND OF THE INVENTION

The aim of the present invention is to obtain a representation of a gesture or movement measured by a set of orientation measuring sensors, so that this representation is limited in terms of the memory space and calculation times required, while preserving the useful information for analyzing the gesture.

Indeed, limiting the memory space and calculation time required to obtain a representation of a movement or gesture from orientation measuring sensor measurements, is of growing interest, notably for applications that can be embedded in mobile terminals, such as mobile phones, touch pads, remote controls, video game controllers, electronic sports items or biomechanical analysis devices embedding very low cost movement sensors for relatively accurate orientation.

One aim of the invention is to address the aforementioned problems.

SUMMARY OF THE INVENTION

Consequently, according to one aspect of the invention, a device is provided for analyzing the movement of at least one moving element, provided, for at least one moving element, with first means for determining the orientation of a moving coordinate frame connected in motion to the moving element, with respect to a reference coordinate frame. The device further includes second means for determining at least one locus of points of at least one surface from at least one respective direction of an oriented axis of the moving coordinate frame connected in motion to the moving element and said surface.

This locus of points on a surface enables the memory size of the stored information to be reduced, or to be seen as preprocessing for obtaining a quantity of limited data representative of a movement or gesture of the moving element connected in motion to a part of the human body of the user, e g the hand, more easily usable by an application than the conventional signals transmitted directly by movement sensors.

This representation is perfectly suited to a spatial representation similar to a preview of the gesture representative of a semantic sign (letter, figure or any normal gesture) made by the brain of the user before performing his/her gesture. Plotting the locus of points, e g on a bounding surface, from the orientation of a pen drawing the letter 'a' "in the air" provides a trace resembling the 'a' on the sphere. This reconstructed trajectory is more easily recognized than the raw signals from sensors fitted on the pen.

In one embodiment, said surface is free of occlusion with respect to at least one point of the moving coordinate frame, or, in other words any surface is such that any half-line with this point as origin intersects this surface at a maximum of one point.

Thus, the locus of points which may be associated with the orientation of the moving body is univocal, e g a single projection of the orientation of the pen previously taken as example on said surface.

According to one embodiment, said surface is all or part of a sphere, and the respective locus of points (for an oriented axis/surface pair) is the set of points of intersection between said all or part of a sphere and said oriented axis attached to said point of the moving coordinate frame.

Thus, a result is obtained taking little space in memory, and easy to use, e g by gesture classification applications, or handwriting recognition, for example.

A locus of respective points may be an ordered series of points, with which a respective instant may even be respectively associated.

According to another aspect of the invention, a gesture recognition system is also provided including a device such as that previously described in which said surface is all or part of a sphere, and the respective locus of points is the set of points of intersection between said all or part of a sphere and said oriented axis attached to said point (Om) of the moving coordinate frame.

Such a system allows easier classification and improved information compression, notably for handwriting recognition in three dimensions. Indeed, the amount of information to be processed by handwriting recognition is then reduced to information describing the locus of the points of intersection with the sphere, which compresses the information while preserving the useful information.

As a variant, said surface may be all or part of a polyhedron, and the respective locus of points (for an oriented axis/surface pair) may be at one series of facets of all or part of said polyhedron including the intersection point between said polyhedron and said oriented axis.

Thus, it is sufficient to store an identifier of the facet, and the associated instant of intersection, which limits the memory size needed. The calculation of said projection will be also faster given the simpler-to-execute intersection calculation, e g maximizing the scalar product between the oriented axis and the vectors normal to the facets is faster than calculating the intersection with a surface.

In one embodiment, the device includes means of storing, for a respective locus of points, durations consecutively associated with the same facet.

Thus, the memory size required is greatly reduced. The memory is therefore further reduced by only storing durations spent sequentially on each facets, e.g. {(no. facet, duration), . . . ,}={(3; 1.15 sec), (5; 1.06 sec), (4; 3.8 sec)}.

According to another aspect of the invention, a gesture recognition system is also provided including a device such as that previously described in which said surface is all or part of a polyhedron, and the respective locus of points (for an oriented axis/surface pair) is a series of facets of all or part of said polyhedron including the intersection point between said polyhedron and said oriented axis.

Such a system can be used to limit the size of memory used, as well as to improve the processing time for the recognition of 'coarser' types of gestures or for the analysis of relatively 'clear-cut' gestural activities, or, in other words, relatively distinguishable ones. It is then possible to adjust the fineness of the information representative of the gesture according to the number of facets of the chosen polyhedron.

According to one embodiment, the device is further provided with third means for determining a translation of the moving coordinate frame connected in motion to the moving element with respect to the reference coordinate frame.

Thus, the device can detect and characterize a translation performed by a moving element.

In one embodiment, said second means for determining at least one locus of points of at least one surface use, in addition, said translation determined by the third determining means.

By taking into account the translation movement of a moving element, the device extends its gestural field and makes it possible to integrate linear displacements if they represent useful information in the application.

As a variant, the device may also include fourth means for determining a criterion representative of the negligible or non-negligible nature of said translation with respect to an average distance between the origin of the moving coordinate frame and a surface point.

Thus, according to the negligible or non-negligible nature of the translation, the second means for determining at least one locus of points of at least one surface may or may not use said translation determined by the third determining means.

According to another aspect of the invention, a method is also provided for analyzing the movement of a moving element, including a first step of determining the orientation of a moving coordinate frame connected in motion to the moving element with respect to a reference coordinate frame, and a second step of determining at least one locus of points of at least one surface from at least one respective direction of an oriented axis of the moving coordinate frame connected in motion to the moving element and said surface.

BRIEF DESCRIPTION OF THE DRAWINGS

The invention will be better understood from studying some embodiments described by way of non-restrictive examples and illustrated by the accompanying drawings in which.

DETAILED DESCRIPTION OF THE PREFERRED EMBODIMENTS

In all the figures, elements having the same references are similar.

Figure 1:
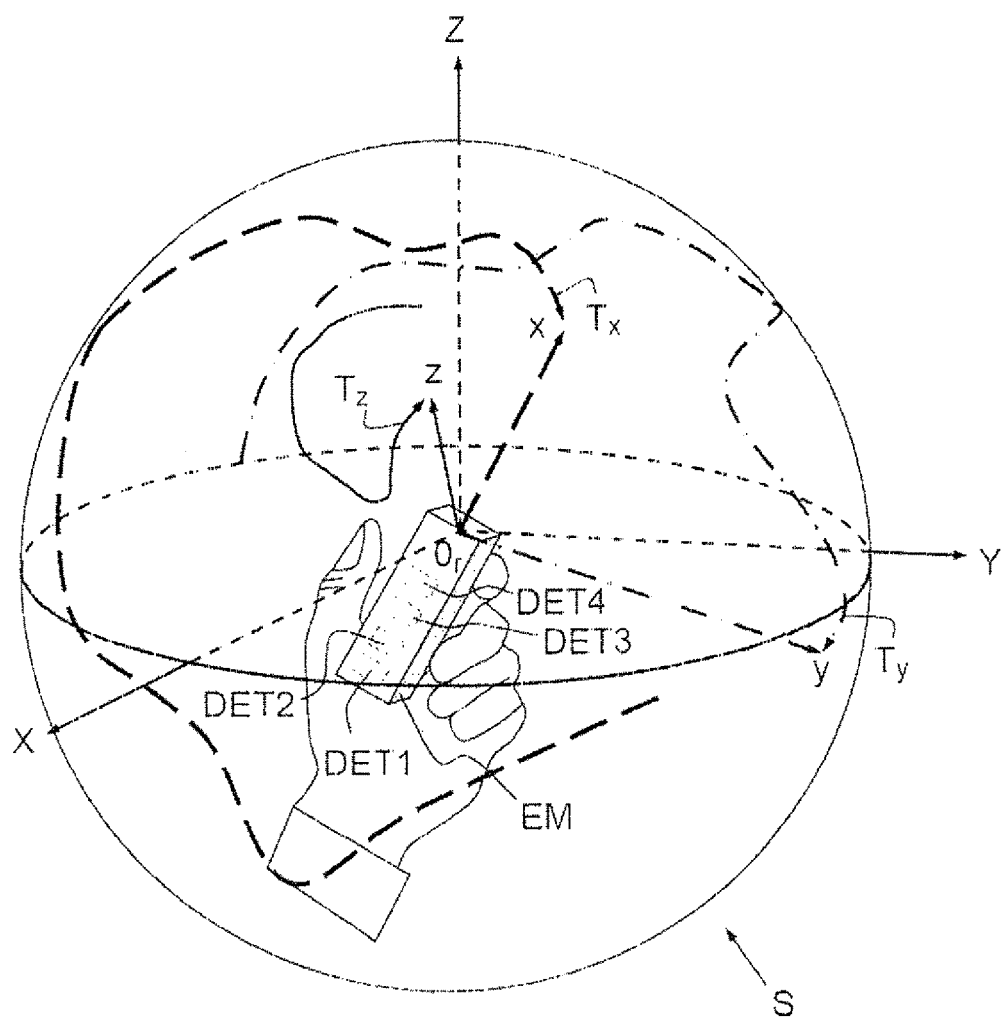
FIG. 1 schematically illustrates an embodiment of the device for which the surface is a sphere, according to one aspect of the invention.

FIG. 1 illustrates a device for analyzing the movement of a moving element EM provided with a first module DET1 for determining the orientation of a moving coordinate frame Rm (Om, x, y, z) connected in motion to the moving element EM, with respect to a reference coordinate frame Rr (Or, X, Y, Z).

The first determining module may be embedded in the moving element EM or located remotely.

Figure 2:
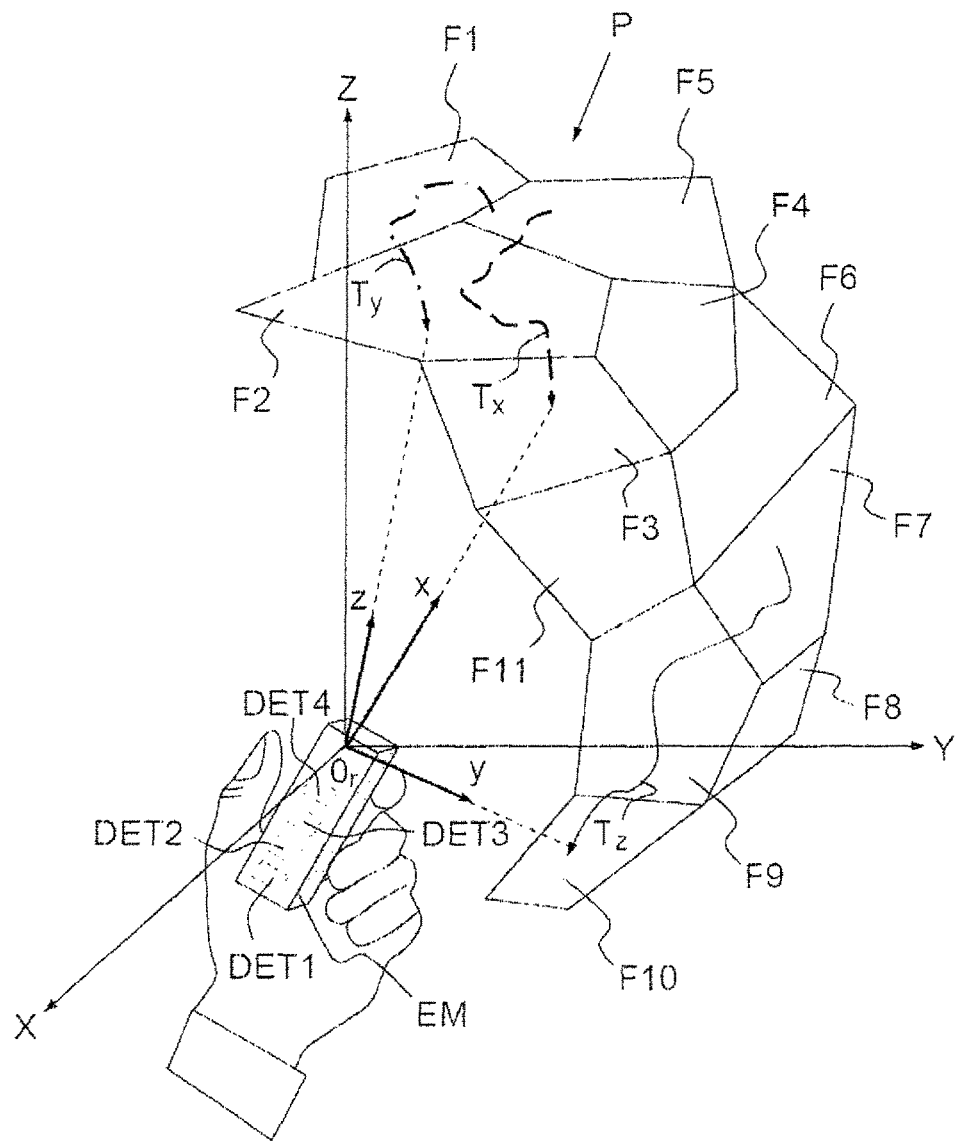
FIG. 2 schematically illustrates an embodiment of the device for which the surface is a portion of a polyhedron, according to one aspect of the invention.

In the event of there being no translation of the moving coordinate frame Rm with respect to the reference coordinate frame Rr, then Om=Or as illustrated in FIGS. 1 and 2.

The moving element may be, for example, a mobile phone, a touch pad, a remote control, a video game controller, an electronic sports item or a biomechanical analysis device. In this case, in FIG. 1, the moving element EM represented is a remote control.

Of course, as a variant, the movement analysis device may include multiple moving elements, e.g attached onto an articulated chain of a human or animal body.

The movement analysis device includes a second module DET2 for determining at least one locus of points of at least one surface from at least one respective direction of an oriented axis x, y, z of the moving coordinate frame Rm connected in motion to the moving element EM and said surface.

A locus of respective points may be an ordered series of points, with which a respective instant may even be respectively associated.

In the example of FIG. 1, the surface is a sphere S centered on the origin Om of the moving coordinate frame Rm, and the locus of points is the trajectory T(t).

Any surface free of occlusion with respect to at least one point of the moving coordinate frame Rm, or, in other words, any surface such that any half-line with this point as origin intersects this surface at a maximum of one point.

The first determining module DET1 may, for example, include an orientation sensor that can be used to follow any moving segment and to provide a rotation matrix of the reference coordinate frame Rr (Or, X, Y, Z) generally fixed, toward the moving coordinate frame Rm (Om, x, y, z) (or the reverse, its transpose).

For example, the orientation sensor may be a complete inertial unit including a triax of accelerometers, a triax of magnetometers and a triax of gyroscopes. In a more restricted and thrifty way while remaining functional in three dimensions, the sensor may be a combination of accelerometers and gyroscopes, a combination of accelerometers and magnetometers, one gyroscope on its own, or a combination of magnetometer and gyroscope. Any other sensitive device capable of returning orientation information is suitable: optical system with multiple coplanar markers, ultrasound, etc.

This orientation signal is a signal with one, two or three dimensions, or respectively two, three or four dimensions by adding a time dimension. This orientation signal is representative of the gesture performed by the moving element EM, in a more or less informative way according to its nature (according to whether the gesture or movement is rather one of 'translation' or of 'twisting').

The segment is referenced by an arbitrary triax, generally composed of three, orthogonal two-by-two, directions x, y, z of origin Or. The idea is to use, not sensor measurements, nor Euler angles, nor other known representations such as rotation matrices or quaternions, but the traces $T_x$, $T_y$ and $T_z$ corresponding respectively to the intersection of the x-, y- and z-axis of the moving coordinate frame Rm with the sphere S centered on Om.

Of course, as a variant, it is possible to have one or two traces only.

Such preprocessing makes it possible to obtain data:
that is univocal (which is not the case in the Euler angle or Cardan space);
that is easily compressible (e.g by geometric discretization on the surface, in this case the sphere S split into arbitrary sectors); and
which benefits from a well distributed topography (the discrete elements).

In the example of FIG. 1, the x-axis is taken as the pointing axis of the moving element EM, in this case the remote control and Om as the midpoint where the user is located. This oriented x-axis, which draws a trajectory in the user's mind, intercepts or intersects, the sphere S of center Om and of arbitrary radius (e g of radius 1 m) in a series of points or trace $T_x=(x, y, z)$ representative of the gesture performed, and very probably close to the trajectory expected by the device.

Similarly, the traces $T_y$ and/or $T_z$ corresponding to the intersections, of the oriented y- and z-axes, with the sphere S (both y- and z-axes are connected for the rotation about the x-axis) may represent or signify an intention of the user to turn the moving element EM about its longitudinal x-axis. Consequently, two traces are sufficient to completely describe the time attitude of the moving element EM, in this case one being $T_x$.

For the current systems, such a series of points or trace is, in general, discrete (due to the sampling of sensors or the numeric calculation) and thus forms a trajectory of points, generally considered in memory as a vector. The gesture forms this points vector which is at the base of the continuous representation, without geometric discretization of the sphere S.

It is obvious why it is advantageous to use movement measuring devices based on inertial sensors given the difficulty, in the state of mass production technology, of measuring a trajectory (current sensors are noisy and put the steps of mathematical integration of signals at a disadvantage for going from acceleration to position) whereas, using prior art algorithms, it is possible to obtain the orientation in three dimensions, i.e. a rotation matrix which can be used to project the point Om along the orientation of the respective axes [Or, x), [Or, y), [Or, z) of the moving element EM toward the points $T_x(x, y, z)$, $T_y(x, y, z)$, $T_z(x, y, z)$ respectively on the sphere S.

Thus, the mode of representation provided transforms the measurement data which represent or signify the gesture in these traces or trajectories drawn intentionally by the user on this surface S These trajectories are closer to the final information representative of the gesture taking place, and de facto, more easily compressible, or more easily classifiable by a gesture recognition system, for example.

In another embodiment, as illustrated in FIG. 2, the surface is all or part of a polyhedron, in this case a part of a polyhedron P.

Consequently, there is a list of facets, in this case ten facets F1, F2, . . . , F10 characterized by their normals. The polyhedron is not necessarily regular and the facets may be numbered. The series of points may then be 'reduced' and coded differently: as the projection intercepts the facet Fi, in this case i varying from 1 to 10, the trajectory is replaced by the coding i Thus it is possible to have a K series pairs $(i, j)^k$ where i is the index of the facet and j the duration during which it has been intercepted by the corresponding axis (x, y, z), k being the index of the pair (k varying from 1 to K).

If the module DET1 for determining the orientation of the moving coordinate frame Rm connected in motion to the moving element EM, with respect to the reference coordinate frame Rr is capable of giving the rotation matrix between the two coordinate frames, it is sufficient to take the first column cx of the rotation matrix for having the direction vector of the x-axis, the second column cy for the direction vector of the y-axis and the third column cz for the direction vector of the z-axis. Then, i is found by applying a method for detecting the intercepted facet.

There are several methods:
calculation of the intersection of planar facets with the half-line carried by Om and oriented by said direction vector A single facet (i) will have a non-zero intersection.

If the faceted surface is a polyhedron whereof the points are substantially on a sphere, it is possible to detect the intercepted facet in a faster way. For each facet, a distance is calculated between said direction vector (VDx, VDy, VDz) of the axis concerned and the normal vector (NXx, NXy, NXz) The intercepted facet will be that of the smallest calculated distance If the faceted surface is a polyhedron whereof the points are substantially on a sphere, it is possible to detect the intercepted facet in a still faster way. For each facet, the scalar product is calculated between said direction vector (VDx, VDy, VDz) of the axis concerned and the normal vector (NXx, NXy, NXz) The intercepted facet will be that of the largest scalar product.

Figure 3:
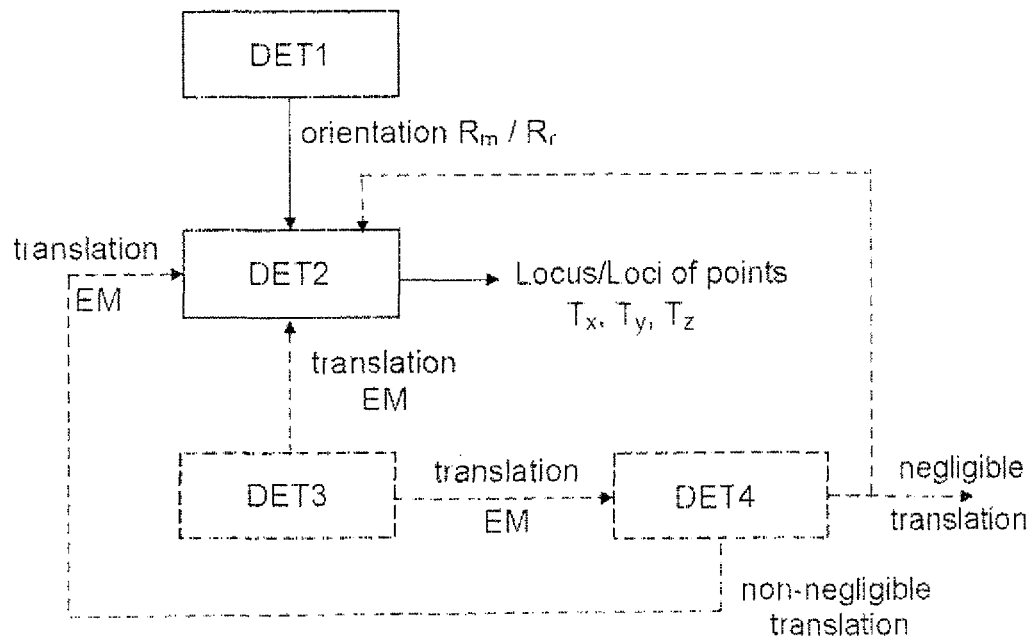
FIG. 3 schematically illustrates an embodiment of the device, according to one aspect of the invention.

As illustrated in FIG. 3, the device may further be provided with a third module DET3 for determining a translation of the moving coordinate frame Rm (connected in motion to the moving element EM) with respect to the reference coordinate frame Rr.

In the event of the presence of a translation determined by the third determining module DET3, it is always possible for the second determining module DET2 to take this translation into account.

In addition, the device may include a fourth module DET4 for determining a criterion representative of the negligible or non-negligible nature of said translation with respect to an average distance between the origin Om of the moving coordinate frame Rm and a surface point.

Thus, according to the negligible or non-negligible nature of the translation, the second module DET2 for determining at least one locus of points of at least one surface may or may not use said translation determined by the third determining module.

Figure 4:
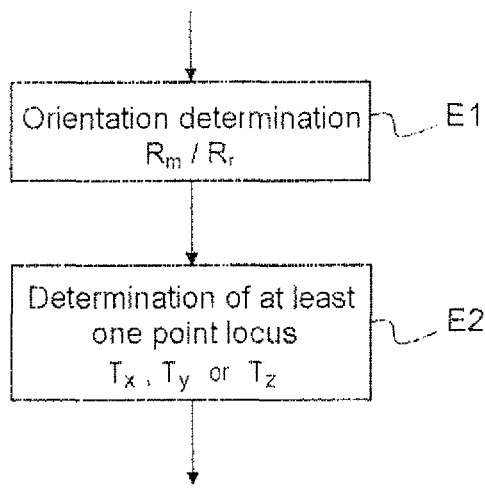
FIG. 4 schematically illustrates an implementation of the method, according to one aspect of the invention.

According to another aspect of the invention, a method is also provided for analyzing the movement of a moving element EM, as illustrated in FIG. 4, including a first step E1 of determining the orientation of the moving coordinate frame Rm connected in motion to the moving element EM with respect to the reference coordinate frame Rr. The method further includes a second step E2 of determining at least one locus of points $T_x$, $T_y$, $T_z$ of at least one surface from at least one respective direction of an oriented axis x, y, z of the moving coordinate frame Rm connected in motion to the moving element EM and said surface.

The steps of the method described above may be performed by one or more programmable processors executing a computer program for performing the functions of the invention by acting on input data and generating output data, in the device according to the invention.

A computer program may be written in any programming language, such as compiled or interpreted languages, and the computer program may be deployed in any form, including as a standalone program or as a subroutine or function, or any other form appropriate for use in a computer environment.

A computer program may be deployed for being executed on a computer or on multiple computers on a single site or on multiple distributed sites interconnected by a communications network.

The invention claimed is:

1. A mobile device for analyzing the movement of at least one moving element (EM), provided, for at least one moving element (EM), with first means (DET1) for determining the orientation of a moving coordinate frame (Rm) connected in motion to the moving element (EM), with respect to a reference coordinate frame (Rr), wherein the first means comprises an orientation sensor having at least an accelerometer, including second means (DET2) comprising at least one processor operable to determine at least one series of facets (F1, F2, ..., F10) of all or part of a polyhedron (P), wherein each of the facets of the series of facets includes at least one intersection point between the polyhedron (P) and at least one respective direction of an oriented axis (x, y, z) of the moving coordinate frame (Rm) connected in motion to the moving element (EM) and the polyhedron (P), the series of facets of all or part of the polyhedron (P) being free of occlusion with respect to at least one point of the moving coordinate frame (Rm).

2. The mobile device as claimed in claim 1, in which the polyhedron is all or part of a sphere (S), and each intersection point is between said all or part of a sphere and said oriented axis attached to said point (Om) of the moving coordinate frame (Rm).

3. The mobile device as claimed in claim 1, including means of storing (MEM), for a respective locus of points, durations consecutively associated with the same facet (F1, F2, ... F10).

4. The mobile device as claimed in one of the preceding claims, further provided with third means (DET3) comprising at least one processor operable to determine a translation of the moving coordinate frame (Rm) connected in motion to the moving element (EM) with respect to the reference coordinate frame (Rr).

5. The mobile device as claimed in claim 4, in which said second means (DET2) for determining at least one series of facets (F 1, F2, ..., F10) of all or part of a polyhedron (P) use, in addition, said translation determined by the third determining means (DET3).

6. The mobile device as claimed in claim 4, further including fourth means (DET4) comprising at least one processor operable to determine a criterion representative of the negligible or non-negligible nature of said translation with respect to an average distance between the origin (Om) of the moving coordinate frame (Rm) and a surface point.

7. A gesture recognition system, including a preprocessing device, as the mobile device claimed in claim 1, for gesture classification.

8. A method for analyzing the movement of at least one moving element (EM) of a mobile device having an orientation sensor including, for at least one moving element, a first step (E1) of determining the orientation of a moving coordinate frame (Rm) connected in motion to the moving element (EM), with respect to a reference coordinate frame (Rr), including a second step (E2) of determining at least one series of facets (F1, F2, ..., F10) of all or part of a polyhedron (P), wherein each of the facets of the series of facets includes at least one intersection point between the polyhedron (P) and at least one respective direction of an oriented axis (x, y, z) of the moving coordinate frame (Rm) connected in motion to the moving element (EM) and the polyhedron (P), the series of facets of all or part of the polyhedron (P) being free of occlusion with respect to at least one point of the moving coordinate frame (Rm).

\* \* \* \* \*